(12) United States Patent
Bercik et al.

(10) Patent No.: US 12,463,822 B2
(45) Date of Patent: Nov. 4, 2025

(54) SHARING SECURITY SETTINGS BETWEEN ENTITIES USING VERIFIABLE CREDENTIALS

(71) Applicant: Microsoft Technology Licensing, LLC, Redmond, WA (US)

(72) Inventors: Bailey Marie Bercik, Seattle, WA (US); Mark David Morowczynski, Seattle, WA (US); Arvind Bipin Suthar, Medina, WA (US); Ramiro Calderon Romero, Monroe, WA (US)

( * ) Notice: Subject to any disclaimer, the term of this patent is extended or adjusted under 35 U.S.C. 154(b) by 379 days.

(21) Appl. No.: 18/058,205

(22) Filed: Nov. 22, 2022

(65) Prior Publication Data
US 2024/0171406 A1 May 23, 2024

(51) Int. Cl.
*H04L 9/32* (2006.01)
*H04L 9/40* (2022.01)

(52) U.S. Cl.
CPC .......... *H04L 9/3247* (2013.01); *H04L 63/102* (2013.01); *H04L 63/20* (2013.01)

(58) Field of Classification Search
CPC ..... H04L 9/3247; H04L 63/102; H04L 63/20; H04L 9/50; G06F 21/577
See application file for complete search history.

(56) References Cited

U.S. PATENT DOCUMENTS

| | | | | |
|---|---|---|---|---|
| 7,178,166 B1 * | 2/2007 | Taylor | ................... | G06F 21/577 709/228 |
| 8,683,598 B1 * | 3/2014 | Cashin | ................... | H04L 63/20 713/188 |
| 9,436,820 B1 * | 9/2016 | Gleichauf | ............... | H04L 63/02 |
| 9,756,047 B1 * | 9/2017 | Batchu | ................ | H04W 12/088 |
| 10,135,874 B1 * | 11/2018 | Perry | ...................... | G06F 21/54 |
| 10,990,584 B1 * | 4/2021 | Basak | ...................... | G06F 16/28 |
| 11,089,107 B1 * | 8/2021 | Chor | ....................... | H04L 63/08 |
| 11,101,986 B2 * | 8/2021 | Carmignani | ............. | H04L 9/50 |
| 11,178,188 B1 * | 11/2021 | Wu | ......................... | H04L 63/20 |
| 11,190,550 B1 * | 11/2021 | Wu | ......................... | H04L 63/20 |

(Continued)

OTHER PUBLICATIONS

International Search Report and Written Opinion received for PCT Application No. PCT/US23/035469, (MS#412295-PCT01), Feb. 8, 2024, 18 pages.

(Continued)

*Primary Examiner* — Aravind K Moorthy
(74) *Attorney, Agent, or Firm* — Workman Nydegger

(57) ABSTRACT

A first verifiable credential is received at a second entity from a first entity. The first verifiable credential is cryptographically signed by the first entity using decentralized identifier (DID) of the first entity. The first verifiable credential includes a security indicator that specifies a security posture of the second entity based on security settings implemented by the second entity. A second verifiable credential is generated that embeds the first verifiable credential therein. The second verifiable credential is provided to a third entity. The second verifiable credential causes the third entity to verify the cryptographic signature of the first entity with a public key associated with the DID of the first entity to determine that the first verifiable credential is valid and that the security settings being implemented by the second entity are in compliance with security policies of the third entity.

20 Claims, 11 Drawing Sheets

(56) References Cited

U.S. PATENT DOCUMENTS

| | | | | |
|---|---|---|---|---|
| 11,223,529 B1* | 1/2022 | Newman | | H04L 49/354 |
| 11,227,032 B1* | 1/2022 | Kraus | | H04L 9/083 |
| 11,271,973 B1* | 3/2022 | Ravi | | H04L 41/22 |
| 11,368,307 B1* | 6/2022 | Ozarkar | | H04L 9/3218 |
| 11,379,213 B1* | 7/2022 | Ansay | | G06F 21/57 |
| 11,539,533 B1* | 12/2022 | Hamel | | G06Q 20/3674 |
| 11,777,932 B1* | 10/2023 | Kempf | | H04L 63/20 |
| | | | | 726/4 |
| 11,928,188 B1* | 3/2024 | McCown | | H04L 9/50 |
| 12,192,243 B2* | 1/2025 | Pereira | | G06N 20/00 |
| 2002/0138726 A1* | 9/2002 | Sames | | H04L 63/1416 |
| | | | | 713/166 |
| 2008/0005798 A1* | 1/2008 | Ross | | H04L 63/08 |
| | | | | 726/26 |
| 2008/0082354 A1 | 4/2008 | Hurry | | |
| 2008/0148340 A1* | 6/2008 | Powell | | H04L 63/0227 |
| | | | | 709/225 |
| 2012/0011573 A1* | 1/2012 | Menasce | | G06F 21/40 |
| | | | | 726/4 |
| 2012/0173425 A1* | 7/2012 | Jeong | | G06F 21/34 |
| | | | | 726/5 |
| 2013/0340074 A1* | 12/2013 | Ayachitula | | G06F 21/577 |
| | | | | 726/22 |
| 2014/0173738 A1* | 6/2014 | Condry | | G06F 21/577 |
| | | | | 726/25 |
| 2014/0201814 A1* | 7/2014 | Barkie | | H04L 63/0892 |
| | | | | 726/4 |
| 2014/0283035 A1* | 9/2014 | Sawhney | | H04L 63/1483 |
| | | | | 726/22 |
| 2014/0359749 A1* | 12/2014 | Rieke | | H04L 63/1433 |
| | | | | 726/11 |
| 2015/0172321 A1* | 6/2015 | Kirti | | H04L 63/1416 |
| | | | | 726/1 |
| 2015/0264055 A1* | 9/2015 | Budhani | | H04L 63/0281 |
| | | | | 726/4 |
| 2016/0080345 A1 | 3/2016 | Safruti | | |
| 2016/0173359 A1* | 6/2016 | Brenner | | A61B 5/02438 |
| | | | | 709/224 |
| 2016/0255115 A1* | 9/2016 | Mital | | H04L 63/20 |
| | | | | 726/1 |
| 2017/0109759 A1* | 4/2017 | Korb | | G06F 21/10 |
| 2017/0324733 A1 | 11/2017 | Howry | | |
| 2018/0211045 A1* | 7/2018 | Abukhovsky | | G06F 21/577 |
| 2018/0324219 A1* | 11/2018 | Xie | | H04W 12/06 |
| 2019/0164156 A1* | 5/2019 | Lindemann | | H04L 9/3271 |
| 2019/0182287 A1* | 6/2019 | Hanley | | H04L 63/20 |
| 2019/0215755 A1* | 7/2019 | Faynberg | | G16H 10/00 |
| 2019/0222424 A1* | 7/2019 | Lindemann | | H04L 9/3297 |
| 2019/0230092 A1* | 7/2019 | Patel | | H04L 9/321 |
| 2019/0306194 A1* | 10/2019 | Benson | | H04L 63/102 |
| 2019/0349350 A1* | 11/2019 | Valites | | G06F 21/6245 |
| 2020/0021620 A1* | 1/2020 | Purathepparambil | | |
| | | | | H04L 63/205 |
| 2020/0036707 A1* | 1/2020 | Callahan | | H04L 67/53 |
| 2020/0127828 A1* | 4/2020 | Liu | | H04L 9/30 |
| 2020/0127847 A1* | 4/2020 | Yang | | H04L 63/0876 |
| 2020/0145229 A1* | 5/2020 | Li | | H04L 9/3247 |
| 2020/0153606 A1* | 5/2020 | Li | | H04L 9/3239 |
| 2020/0244704 A1* | 7/2020 | Andrews | | H04L 63/10 |
| 2020/0313897 A1* | 10/2020 | Heath | | G06Q 10/0835 |
| 2020/0322369 A1* | 10/2020 | Raghuramu | | H04L 63/102 |
| 2020/0374132 A1* | 11/2020 | Lobban | | G06Q 10/00 |
| 2020/0403789 A1* | 12/2020 | Murdoch | | H04L 9/0869 |
| 2020/0403805 A1* | 12/2020 | Steele | | H04L 9/3242 |
| 2021/0006410 A1* | 1/2021 | Uhr | | G06Q 20/065 |
| 2021/0011905 A1* | 1/2021 | Uhr | | H04L 9/0637 |
| 2021/0036866 A1* | 2/2021 | Zolfonoon | | H04L 67/34 |
| 2021/0037040 A1* | 2/2021 | Aleks | | H04L 63/1433 |
| 2021/0084039 A1* | 3/2021 | Murdoch | | H04L 63/0823 |
| 2021/0092108 A1* | 3/2021 | Jen | | G06F 21/45 |
| 2021/0119807 A1* | 4/2021 | Chen | | H04L 9/3242 |
| 2021/0194871 A1* | 6/2021 | Batchu | | H04L 63/102 |
| 2021/0266162 A1* | 8/2021 | Murdoch | | G06F 21/32 |
| 2021/0271765 A1* | 9/2021 | Murdoch | | H04L 63/10 |
| 2021/0272120 A1* | 9/2021 | Murdoch | | G06Q 20/3829 |
| 2021/0273931 A1* | 9/2021 | Murdoch | | H04L 9/3239 |
| 2021/0281421 A1* | 9/2021 | Semenovskiy | | G06Q 20/3276 |
| 2021/0287770 A1* | 9/2021 | Anderson | | G16H 40/20 |
| 2021/0288974 A1* | 9/2021 | Murdoch | | H04L 9/3213 |
| 2021/0306151 A1* | 9/2021 | Murdoch | | H04L 63/00 |
| 2021/0312073 A1* | 10/2021 | Yang | | H04L 63/126 |
| 2021/0314293 A1* | 10/2021 | Soundararajan | | H04L 63/10 |
| 2021/0326859 A1* | 10/2021 | Meng | | H04L 9/0866 |
| 2021/0326880 A1* | 10/2021 | Yang | | H04L 63/0428 |
| 2021/0329067 A1* | 10/2021 | Yang | | H04L 67/51 |
| 2021/0351935 A1* | 11/2021 | Mishra | | H04L 9/3239 |
| 2021/0359858 A1* | 11/2021 | Lainio | | H04L 9/3239 |
| 2021/0367975 A1* | 11/2021 | Wood | | H04L 41/5054 |
| 2021/0385216 A1* | 12/2021 | Khalil | | H04L 9/50 |
| 2021/0397688 A1* | 12/2021 | Yang | | G06F 16/27 |
| 2022/0005029 A1* | 1/2022 | Wei | | H04L 9/30 |
| 2022/0029825 A1* | 1/2022 | Uhr | | H04L 9/3239 |
| 2022/0038268 A1* | 2/2022 | Zhang | | H04L 9/0847 |
| 2022/0043902 A1* | 2/2022 | Olson | | H04L 9/30 |
| 2022/0094596 A1* | 3/2022 | Jagannathan | | H04L 41/0895 |
| 2022/0103569 A1* | 3/2022 | Galloway | | H04L 63/0227 |
| 2022/0173891 A1* | 6/2022 | Kim | | H04L 9/3247 |
| 2022/0245652 A1* | 8/2022 | Nonni | | G06Q 20/401 |
| 2022/0253833 A1* | 8/2022 | Nonni | | G06Q 20/3674 |
| 2022/0272085 A1* | 8/2022 | Novotny | | G06F 16/2379 |
| 2022/0309514 A1* | 9/2022 | Lee | | G06Q 20/0655 |
| 2022/0329653 A1* | 10/2022 | Govindarajan | | H04L 67/51 |
| 2022/0385476 A1* | 12/2022 | Murdoch | | H04L 63/126 |
| 2023/0025486 A1* | 1/2023 | Shenoy | | H04L 63/0272 |
| 2023/0031804 A1* | 2/2023 | Shimizu | | H04L 63/08 |
| 2023/0051854 A1* | 2/2023 | Manian | | G06Q 20/3674 |
| 2023/0083642 A1* | 3/2023 | Saginawa | | G06F 21/6245 |
| | | | | 726/27 |
| 2023/0103021 A1* | 3/2023 | Cho | | G06Q 20/363 |
| | | | | 726/19 |
| 2023/0104103 A1* | 4/2023 | Eby | | G06Q 20/3678 |
| | | | | 705/69 |
| 2023/0117628 A1* | 4/2023 | Giffard-Burley | | G06F 16/93 |
| | | | | 707/736 |
| 2023/0121349 A1* | 4/2023 | Griggs | | H04L 9/3236 |
| | | | | 713/168 |
| 2023/0132505 A1* | 5/2023 | Lee | | H04L 9/3239 |
| | | | | 713/156 |
| 2023/0171238 A1* | 6/2023 | Stocker | | H04L 63/083 |
| | | | | 726/8 |
| 2023/0177495 A1* | 6/2023 | Duffy | | G06Q 20/3674 |
| | | | | 705/76 |
| 2023/0179590 A1* | 6/2023 | Kim | | H04L 9/3247 |
| | | | | 726/6 |
| 2023/0185894 A1* | 6/2023 | Sorensen | | H04L 9/3073 |
| | | | | 726/7 |
| 2023/0205891 A1* | 6/2023 | Yellapragada | | H04L 63/1416 |
| | | | | 726/25 |
| 2023/0216947 A1* | 7/2023 | Bernardi | | H04L 67/10 |
| | | | | 713/150 |
| 2023/0254250 A1* | 8/2023 | Moreno | | H04L 45/74 |
| | | | | 370/392 |
| 2023/0259918 A1* | 8/2023 | Rao | | G06Q 20/4014 |
| | | | | 705/67 |
| 2023/0275927 A1* | 8/2023 | Shetty | | H04L 63/08 |
| | | | | 726/1 |
| 2023/0316192 A1* | 10/2023 | Roytman | | G06Q 10/0635 |
| | | | | 705/7.28 |
| 2023/0318605 A1* | 10/2023 | Pimenta | | G06F 21/76 |
| | | | | 326/37 |
| 2023/0319039 A1* | 10/2023 | Murdoch | | G06F 21/335 |
| | | | | 726/9 |
| 2023/0324864 A1* | 10/2023 | Bursch | | G05B 19/042 |
| | | | | 700/276 |
| 2023/0370452 A1* | 11/2023 | Mannengal | | H04L 41/12 |
| 2023/0396649 A1* | 12/2023 | Mathur | | H04L 63/1425 |
| 2024/0028713 A1* | 1/2024 | Dhoble | | G06F 21/554 |
| 2024/0028739 A1* | 1/2024 | Sayyed | | G06F 21/54 |
| 2024/0056309 A1* | 2/2024 | He | | H04L 9/3247 |
| 2024/0073194 A1* | 2/2024 | Dhunay | | G06Q 20/3821 |

(56) References Cited

U.S. PATENT DOCUMENTS

| | | | |
|---|---|---|---|
| 2024/0080342 A1* | 3/2024 | Mishra Gupta | H04L 63/20 |
| 2024/0086918 A1* | 3/2024 | Gisolfi | G06Q 20/34 |
| 2024/0143779 A1* | 5/2024 | Shetty | G06F 21/577 |
| 2024/0146768 A1* | 5/2024 | DeJarnett | H04L 63/105 |
| 2024/0154887 A1* | 5/2024 | Paczkowski | H04L 67/125 |
| 2024/0171406 A1* | 5/2024 | Bercik | H04L 9/3247 |
| 2024/0171579 A1* | 5/2024 | Paraskeva | H04L 63/102 |
| 2025/0038993 A1* | 1/2025 | Li | H04L 9/3239 |

OTHER PUBLICATIONS

International preliminary report on patentability Received for PCT Application No. PCT/US23/035469, mailed on Jun. 5, 2025, 12 Pages.

* cited by examiner

SHARING SECURITY SETTINGS BETWEEN ENTITIES USING VERIFIABLE CREDENTIALS

BACKGROUND

Oftentimes, businesses would like to work with business partners on collaborative projects or to provide services to the business partners. However, in today's environment where fraud and other malicious behavior is common, a business typically wants to ensure that its business partners are implementing a certain level of security before transacting any business with them. This helps to ensure that the business is protected from any fraud or malicious behavior caused by the lack of security from its business partners. Accordingly, the business often must spend a large amount of time and resources ensuring that its business partners have the required level of security.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one embodiment a first verifiable credential is received at a second entity from a first entity. The first verifiable credential is cryptographically signed by the first entity using decentralized identifier (DID) of the first entity. The first verifiable credential includes a security indicator that specifies a security posture of the second entity based on security settings implemented by the second entity. A second verifiable credential is generated that embeds the first verifiable credential therein. The second verifiable credential is provided to a third entity. The second verifiable credential causes the third entity to verify the cryptographic signature of the first entity with a public key associated with the DID of the first entity to determine that the first verifiable credential is valid and that the security settings being implemented by the second entity are in compliance with security policies of the third entity.

In another embodiment a first entity generates a verifiable credential that includes a security indicator specifying a security posture of a second entity that is based security settings being implemented by the second entity. The verifiable credential is cryptographically signed using a decentralized identifier (DID) of the first entity. The first entity provides the verifiable credential to the second entity.

In a further embodiment, a third entity receives a second verifiable credential which has embedded therein a first verifiable credential. The second verifiable credential is generated by a second entity and is cryptographically signed by the second entity using a decentralized identifier (DID) of the second entity. The first verifiable credential is generated by a first entity and is cryptographically signed by the first entity using a DID. of the first entity. The third entity accesses a distributed ledger to verify that the cryptographic signature of the first entity is valid using a public key associated with the first entity. The third entity extracts a security indicator from the first verifiable credential. The security indicator specifies a security posture of the second entity that is based on security settings being implemented by the second entity. The third entity determines if the security posture of the second entity is in compliance with security policies of the third entity.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Figure 1:
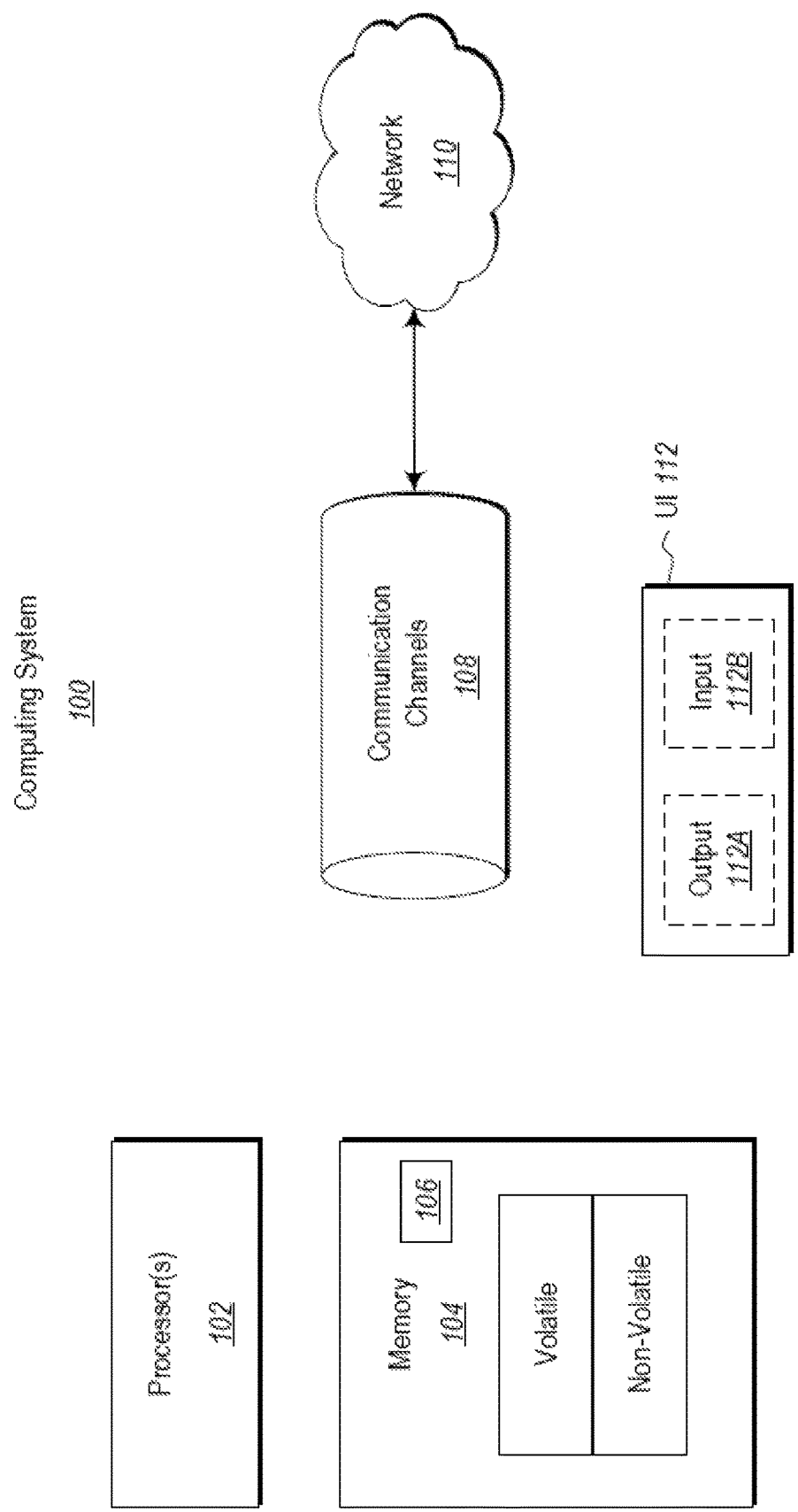
FIG. 1 illustrates an example computing system in which the principles described herein may be employed.

A first business entity and a second business entity are able to conduct business with each other. For example, the second business entity may include a service second business entity is able to purchase. Alternatively, first and second business entities may collaborate on a shared business objective or project. However, the second business entity may include various security policies that specify the types of security settings, security policies, and/or other security configurations that the first business entity should have before the second business entity will do business with the first business entity.

Thus, the second business entity may desire to know if the first business entity is able to comply the security policies of the second business entity before beginning to do business together. In conventional systems, there is no efficient way for the first business entity to show that it is able to comply with the security policies of the second business entity without going through a lengthy audit that often requires several phone calls and meetings, which may consume a large amount of time and computing resources.

In addition, the first business entity will often provide proof of compliance with the security policies through the use of screen shots and the like that attempt to show that the first business entity is implementing security settings that are in compliance with the security policies of the second business entity. However, even if the screen shots show that the security settings are in compliance with the security policies, there is often no way for the second business entity to ensure that the first business entity is in fact implementing the compliant security settings. That is, the second business entity often has no way of knowing whether the screen shots have been fraudulently produced by the first business entity.

One solution would be to allow the second business entity access to the security settings of the first business entity so that the second business entity could verify that the security settings of the first business entity were actually in compliance with security policies of the second business entity. However, allowing access to the second business entity might allow the second business entity to gain information about underlying security infrastructure implemented by the first business entity. With such information, the second business entity could learn of specific weak points in the security infrastructure of the first business entity that second business entity could exploit should it have a malicious intent. Accordingly, there is little incentive for the first business entity to allow such access to the second business entity even at the cost of doing business with the second business entity.

Accordingly, the embodiments disclosed herein provide a novel solution to these problems through use of a security endorsement entity. In the embodiments, the security endorsement entity is a well-known, trusted entity that is able to provide a security endorsement verifiable credential to the first business entity that specifies the security settings being implemented by the first business entity. The first business entity can then provide the security endorsement verifiable credential to the second business entity. The second business entity is then able to verify that the security endorsement verifiable credential is from the security endorsement entity. Because the security endorsement entity is a well-known, trusted entity, the second business entity can trust the security endorsement verifiable credential provided by the security endorsement entity and can know which security settings of the first business entity is implementing. If these security settings are sufficient to comply with the security policies of the second business entity, the second business entity can confidently do business with the first business entity.

In one embodiment a first verifiable credential is received at a second entity from a first entity. The first verifiable credential is cryptographically signed by the first entity using decentralized identifier (DID) of the first entity. The first verifiable credential includes a security indicator that specifies a security posture of the second entity based on security settings implemented by the second entity. A second verifiable credential is generated that embeds the first verifiable credential therein. The second verifiable credential is provided to a third entity. The second verifiable credential causes the third entity to verify the cryptographic signature of the first entity with a public key associated with the DID of the first entity to determine that the first verifiable credential is valid and that the security settings being implemented by the second entity are in compliance with security policies of the third entity.

In another embodiment a first entity generates a verifiable credential that includes a security indicator specifying a security posture of a second entity that is based security settings being implemented by the second entity. The verifiable credential is cryptographically signed using a decentralized identifier (DID) of the first entity. The first entity provides the verifiable credential to the second entity.

In a further embodiment, a third entity receives a second verifiable credential which has embedded therein a first verifiable credential. The second verifiable credential is generated by a second entity and is cryptographically signed by the second entity using a decentralized identifier (DID) of the second entity. The first verifiable credential is generated by a first entity and is cryptographically signed by the first entity using a DID. of the first entity. The third entity accesses a distributed ledger to verify that the cryptographic signature of the first entity is valid using a public key associated with the first entity. The third entity extracts a security indicator from the first verifiable credential. The security indicator specifies a security posture of the second entity that is based on security settings being implemented by the second entity. The third entity determines if the security posture of the second entity is in compliance with security policies of the third entity.

Because the principles described herein is performed in the context of a computing system, some introductory discussion of a computing system will be described with respect to FIG. 1. Then, this description will return to the principles of the embodiments disclosed herein with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processing unit 102 and memory 104, as needed to perform their various functions.

Figure 2:
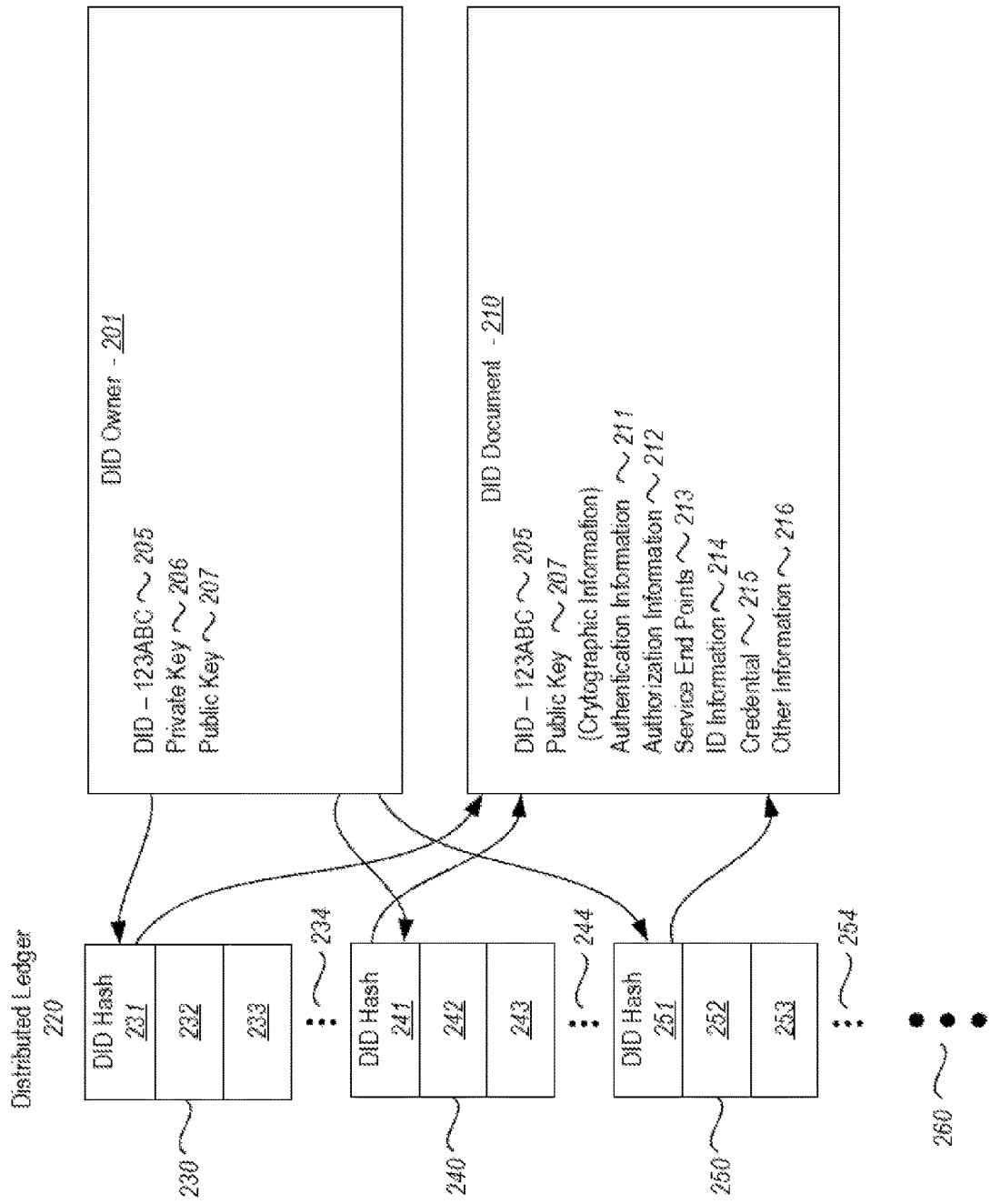
FIG. 2 illustrates an example environment for creating a decentralized identifier (DID)

Some introductory discussions of a decentralized identification (DID) and the environment in which they are created and reside will now be given with respect to FIG. 2, which illustrates a decentralized network 200. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably, a globally unique identifier for identity systems anticipated to operate globally. In some embodiments, the DID 205 is a Uniform Resource Identifier (URI) (such as a Uniform Resource Locator (URL)) or other pointer that relates the DID owner 201 to a mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs that are based on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably is a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 is also used to verify that the DID owner 201, in fact, owns or controls the DID 205.

The DID document 210 also includes authentication information 211. The authentication information 211 specifies one or more mechanisms by which the DID owner 201 is able to prove that the DID owner 201 owns the DID 205. In other words, the mechanisms of the authentication information 211 show proof of a binding between the DID 205 (and thus its DID owner 201) and the DID document 210. In one embodiment, the authentication information 211 specifies that the public key 207 may be used in a signature operation to prove the ownership of the DID 205. Alternatively, or in addition, the authentication information 211 specifies that the public key 207 may be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 205 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 includes a pen name in the DID document when identifying him or her as a writer posting articles on a blog; a persona is fully anonymous, e.g., the DID owner 201 only wants to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes verifiable credential information 215, which may also be referred to herein as an attestation. The verifiable credential information 215 (also referred to as a verifiable claim) is any information that is associated with the DID owner 201's background. For instance, the verifiable credential information 215 is (but not limited to) a qualification, an achievement, a government ID, a government right such as a passport or a driver's license, a digital asset provider or bank account, a university degree or other educational history, employment status and history, or any other information about the DID owner 201's background. In the embodiments disclosed herein, as will be explained in more detail to follow, the verifiable credential information 215 is related to a security posture endorsement such as a score that indicates if an entity is sufficiently following a security policy.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger 220, which in some embodiments may be referred to as a "trust system". The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger 220 operates according to any known standards or methods for distributed ledgers. Examples of conventional distributed ledgers that correspond to the distributed ledger 220 include, but are not limited to, Bitcoin [BTC], Ethereum, Litecoin, and other blockchains.

In the context of the DID 205, the distributed ledger 220 is used to store a representation of the DID 205 that points to the DID document 210. In some embodiments, the DID document 210 is stored on the distributed ledger. Alternatively, in other embodiments the DID document 210 is stored in a data storage (not illustrated) that is associated with the distributed ledger 220.

As mentioned, a representation of the DID 205 is stored on each distributed computing system of the distributed ledger 220. For example, in FIG. 2 this is shown as the DID hash 231, the DID hash 241, and the DID hash 251, which are ideally identical copies of the same DID. The DID hash 231, the DID hash 241, and the DID hash 251 then point to the location of the DID document 210. The distributed ledger 220 also stores numerous other representations of other DIDs as illustrated by references 232, 233, 234, 242, 243, 244, 252, 253, and 254.

In one embodiment, when the DID owner 201 creates the DID 205 and the associated DID document 210, the DID hash 231, the DID hash 241, and the DID hash 251 are written to the distributed ledger 220. The distributed ledger 220 thus records that the DID 205 now exists. Since the distributed ledger 220 is decentralized, the DID 205 is not under the control of any entity outside of the DID owner 201. The DID hash 231, the DID hash 241, and the DID hash 251 include, in addition to the pointer to the DID document 210, a record or timestamp that specifies when the DID 205 was created. At a later date when modifications are made to the DID document 210, this also is recorded in the DID hash 231, the DID hash 241, and the DID hash 251. The DID hash 231, the DID hash 241, and the DID hash 251 further includes a copy of the public key 207 so that the DID 205 is cryptographically bound to the DID document 210.

Figure 3:
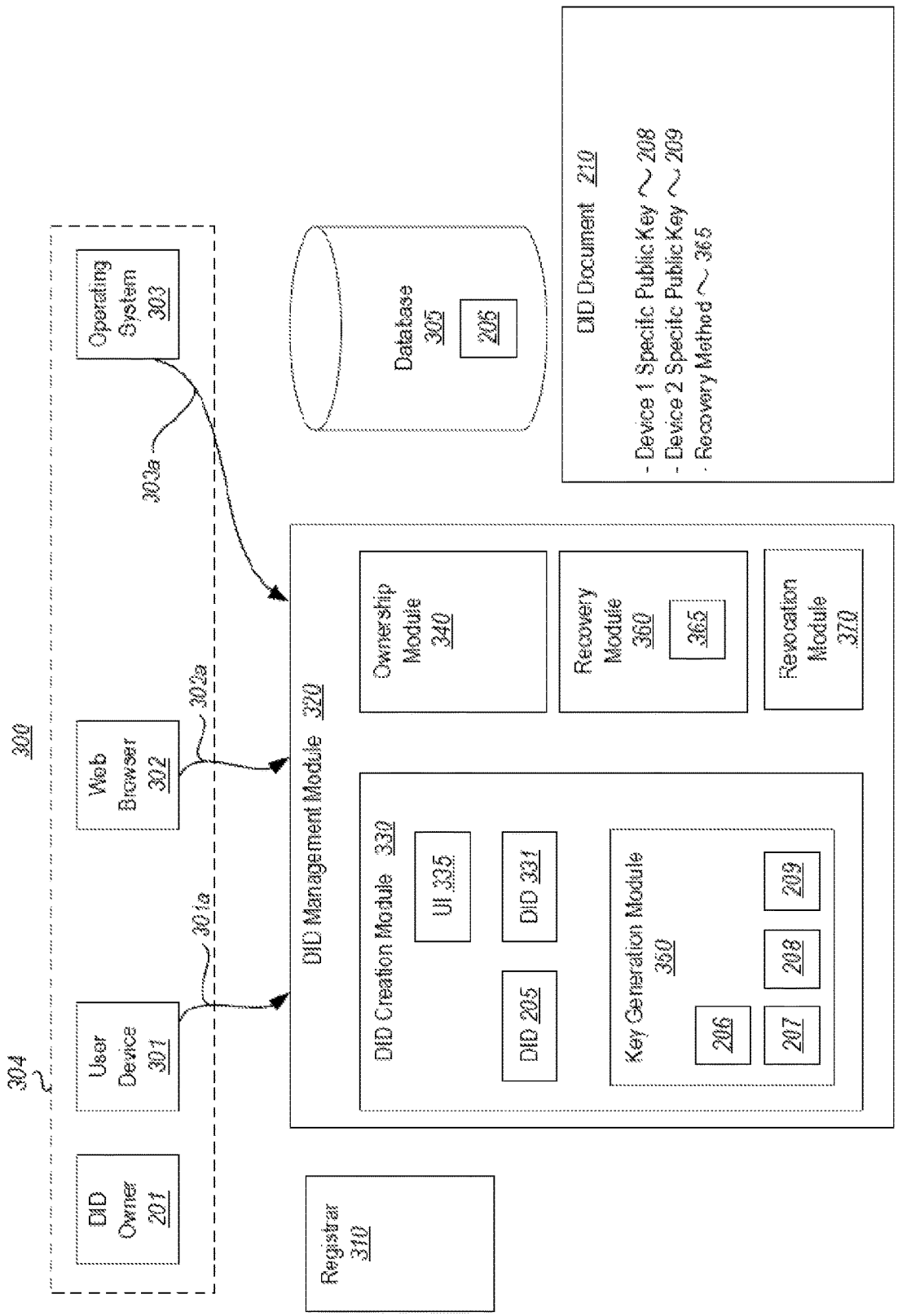
FIG. 3 illustrates an example environment for various DID management operations and services.

Having described DIDs and how they operate generally with reference to FIG. 2, specific embodiments of DID environments will now be explained. Turning to FIG. 3, a computing system environment 300 that is used to perform various DID management operations and services will now be explained. It will be appreciated that the environment of FIG. 3 references elements from FIG. 2 as needed for ease of explanation.

As shown in FIG. 3, the computing system environment 300 includes various devices and computing systems that are owned or otherwise under the control of the DID owner 201. These include a user device 301. The user device 301 is, but is not limited to, a mobile device such as a smart phone, a computing device such as a laptop computer, or any device such as a car or an appliance that includes computing capabilities. The user device 301 includes a web browser 302 operating on the device and an operating system 303 operating the device. More broadly speaking, the dashed line 304 represents that all of these devices are owned or otherwise under the control of the DID owner 201.

The computing system environment 300 also includes a DID management module 320. It will be noted that in operation, the DID management module 320 resides on and is executed by one or more of user device 301, web browser 302, and the operating system 303 as illustrated by respective lines 301a, 302a, and 303a. Accordingly, the DID management module 320 is shown as being separate for ease of explanation. In some embodiments, the DID management module 320 is referred to as a "digital wallet" or a "user agent". It will be appreciated by one of skill in the art, however, that a digital wallet or user agent can be implemented in a computing system other than the DID management module 320 in other embodiments.

As shown in FIG. 3, the DID management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guides the DID owner 201 in creating the DID 205. The DID creation module 330 has one or more drivers that are configured to work with specific distributed ledgers such as distributed ledger 220 so that the DID 205 complies with the underlying methods of that distributed ledger.

A specific embodiment will now be described. For example, the UI 335 prompts the user to enter a username or some other human recognizable name. This name is used as a display name for the DID 205 that will be generated. As previously described, the DID 205 is a long string of random numbers and letters and so having a human-recognizable name for a display name is advantageous. The DID creation module 330 then generates the DID 205. In the embodiments having the UI 335, the DID 205 is shown in a listing of identities and is associated with the human-recognizable name.

The DID creation module 330 also included a key generation module 350. The key generation module generates the private key 206 and public key 207 pair previously described. The DID creation module 330 uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process uses the public key 207 in the hash generation.

In some embodiments, the DID management module 320 includes an ownership module 340. The ownership module 340 provides mechanisms that ensure that the DID owner 201 is in sole control of the DID 205. In this way, the provider of the DID management module 320 is able to ensure that the provider does not control the DID 205 but is only providing the management services.

As previously discussed, the key generation module 350 generates the private key 206 and public key 207 pair and the public key 207 is then recorded in the DID document 210. Accordingly, the public key 207 is usable by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205, which update would be reflected in a transaction on the distributed ledger 220, as previously described.

In some embodiments, however, it is advantageous to have a public key per user device 301 owned by the DID owner 201 as this allows the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 generates additional public keys 208 and 209 when the additional devices execute the DID creation module 330. These additional public keys are associated with the private key 206 or in some instances are paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID document 210 often includes the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the DID creation module 330 via the registrar 310 and this would be reflected in an updated transaction on the distributed ledger 220.

In some embodiments, the DID owner 201 often desires to keep secret the association of a device with a public key or the association of a device with the DID 205. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it may be useful for each device, or some subset of devices under the control of the DID owner 201, to each have their own DID. Thus, in some embodiments the DID creation module 330 generates an additional DID, for example DID 331, for each device. The DID creation module 330 then generates private and public key pairs and DID documents for each of the devices and has them recorded on the distributed ledger 220 in the manner previously described. Such embodiments are advantageous for devices that change ownership as it is possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, web browser 302, or operating system 303 that is owned or controlled by the DID owner 201 that executed the DID management module 320. In this way, there is little chance that of a third-party (and most consequentially, the provider of the DID management module 320) gaining control of the private key 206.

However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. As an example, the database 305 may be one of the identity hubs 410 described below with respect to FIG. 4. A storage module 380 is configured to store data (such as the private key 206 or the verifiable credential information 215 made by or about the DID owner 201) off device in the database 305 or in the identity hubs 410 that will be described in more detail to follow. Of course, in some embodiments the storage module 380 stores at least some data on the device if the device has sufficient storage resources. In some embodiments, the private key 206 is stored as a QR code that is scanned by the DID owner 201.

In other embodiments, the DID management module 320 includes a recovery module 360 that is used to recover a lost private key 206. In operation, the recovery module 360 allows the DID owner 201 to select one or more recovery mechanisms 365 at the time the DID 205 is created that are later used to recover the lost private key. In those embodiments having the UI 335, the UI 335 allows the DID owner 201 to provide information that will be used by the one or more recovery mechanisms 365 during recovery. The recovery module 360 run on any device associated with the DID 205.

The DID management module 320 also included a revocation module 370 that is used to revoke or sever a device from the DID 205. In operation, the revocation module uses the UI 335, which allows the DID owner 201 to indicate a desire to remove a device from being associated with the DID 205. In one embodiment, the revocation module 370 accesses the DID document 210 and causes all references to the device to be removed from the DID document 210. Alternatively, the public key for the device is removed. This change in the DID document 210 is then reflected as an updated transaction on the distributed ledger 220 as previously described.

Figure 4:
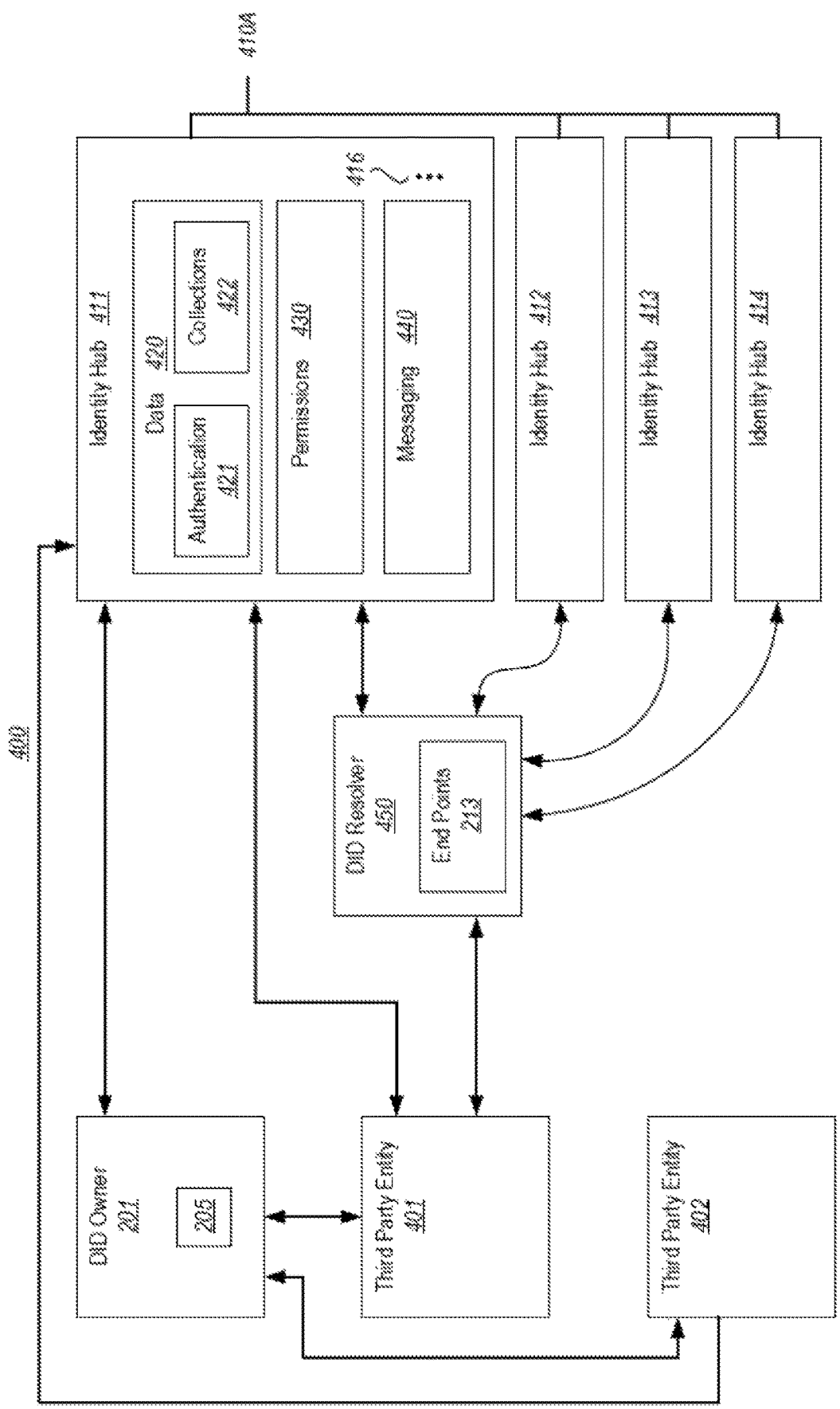
FIG. 4 illustrates an example decentralized personal storage or identity hub.

FIG. 4 illustrates an embodiment of a computing system environment 400 in which a DID such as DID 205 is utilized. Specifically, the computing system environment 400 is used to describe the use of the DID 205 in relation to one or more decentralized stores or identity hubs 410 that are each under the control of the DID owner 201 to store data belonging to or regarding the DID owner 201. In some embodiments, the identity hubs may be referred to as decentralized web nodes. For instance, data is stored within the identity hubs using the storage module 380 of FIG. 3. It will be noted that FIG. 4 includes references to elements first discussed in relation to FIG. 2 or 3 and thus uses the same reference numeral for ease of explanation.

In one embodiment, the identity hubs 410 are multiple instances of the same identity hub. This is represented by the line 410A. Thus, the various identity hubs 410 include at least some of the same data and services. Accordingly, if a change is made to part of at least some of the data (and potentially any part of any of the data) in one of the identity hubs 410, the change is reflected in one or more of (and perhaps all of) the remaining identity hubs.

The identity hubs 410 may be any data store that is under the exclusive control of the DID owner 201. As an example only, the first identity hub 411 and second identity hub 412 are implemented in cloud storage (perhaps within the same cloud, or even on different clouds managed by different cloud providers) and thus are able to hold a large amount of data. Accordingly, a full set of the data is storable in these identity hubs.

However, the identity hubs 413 and 414 may have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will be provided as this description also applies to the identity hubs 412 through 414. As illustrated, identity hub 411 includes data storage 420. The data storage 420 is used to store any type of data that is associated with the DID owner 201. In one embodiment the data is a collection 422 of a specific type of data corresponding to a specific protocol. For example, the collection 422 may be security posture information related to a security posture of the DID owner 201. The collection 422 also includes other types of data, such as verifiable credential information 215 made by or about the DID owner 201.

In one embodiment, the stored data has different authentication and privacy settings 421 associated with the stored data. For example, a first subset of the data has a setting 421 that allows the data to be publicly exposed, but that does not include any authentication to the DID owner 201. This type of data is typically for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with business associates of the DID owner 201 are able to decrypt this data. With respect to data stored by the storage module 380, these settings 421 are at least partially composed by the storage module 380 of FIG. 3.

In some embodiments, the identity hub 411 has a permissions module 430 that allows the DID owner 201 to set specific authorization or permissions for third parties such as third parties 401 and 402 to access the identity hub. For example, the DID owner 201 provides access permission to a business associate who is currently doing business with the DID owner 201 to all the data stored in data storage 420. It will be appreciated that the DID owner 201 is able to give permission to any number of third parties to access a subset of the data stored in data storage 420. This will be explained in more detail to follow. With respect to data stored by the storage module 380, these access permissions 430 are at least partially composed by the storage module 380 of FIG. 3.

The identity hub 411 also include a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 wishes to authenticate a new user device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 is not able to initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 searches the distributed ledger 220 using the DID 205, which should result in the DID resolver 450 finding the DID document 210. The DID document 210 is then provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge is structured such that only a device having access to the private key 206 will be able to successfully answer the challenge.

In this embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password, or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provides the DID 205 to the third-party 401 so that the third-party is able to access data or services stored on the identity hub 411. Accordingly, the DID owner 201 provides the DID 205 to the third-party 401.

Once the third-party 401 has access to the DID 205, he or she accesses the DID resolver 450 to access the DID document 210. As previously discussed, the DID document 210 includes a service end point 213 that is an address or pointer to services associated with the decentralized identity.

The messaging module 440 then messages the third-party 401 informing the third-party that he or she is able to access the research data. The identity hub 411 and the third-party 401 directly communicate so that the third-party is able to access the data. It will be noted that in many cases, it will actually be an identity hub associated with the third-party 401 that communicates with the identity hub 411. However, it may be a device of the third-party 401 that does the communication.

Advantageously, the above described process allows the identity hub 411 and the third-party 401 to communicate and to share the data without the need for the third-party to access the identity hub 411 in the conventional manner. Rather, the communication is provisioned in the decentralized manner using the DID 205 and the DID document 210. This advantageously allows the DID owner to be in full control of the process.

As shown in FIG. 4, the third-party 402 also requests permission for access to the identity hub 411 using the DID 205 and the DID document 210. Accordingly, the embodiments disclosed herein allow access to any number of third parties to the identity hubs 410.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

Figure 5B:
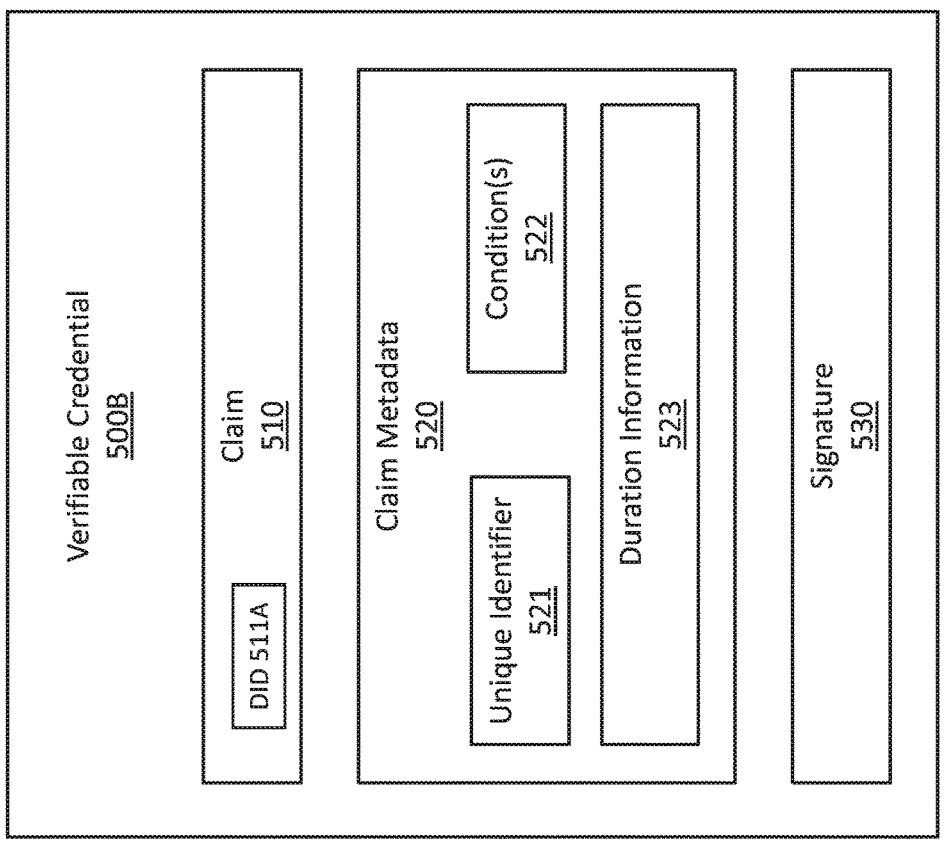
FIG. 5B illustrates an example verifiable credential.
Figure 5A:
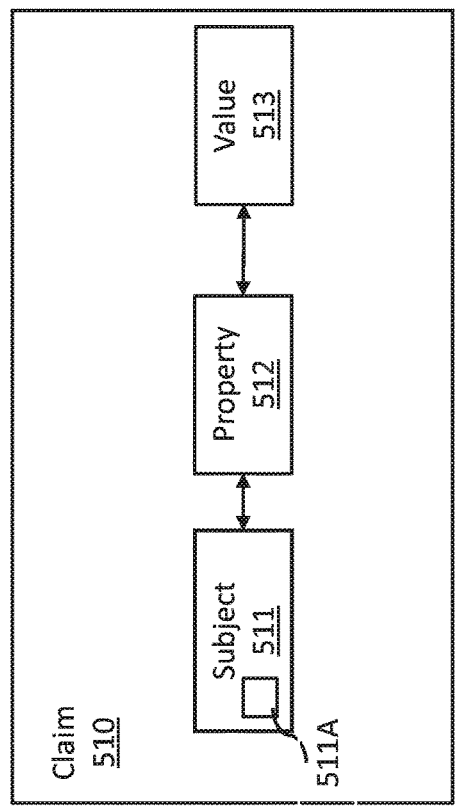
FIG. 5A illustrates an example claim.

FIG. 5A illustrates an example data structure that represents a claim 510. The claim 510 includes a subject 511, a property 512 and a value 513. For example, the subject 511 corresponds to an owner of a DID (e.g., DID owner 201), and a DID 511A corresponding to DID 205 is recorded as part of the subject 511. The property 512 may be any property of the owner of the DID 511A, such as a name, a phone number, an email address, etc. The value 513 is a value of the corresponding property 512. For example, when the property is "name", the value would be the name of the owner of the DID, e.g., Company A; when the property is "phone number", the value would be the phone number of the owner of the DID, e.g., 1-800-123-4567.

FIG. 5B illustrates an example data structure of a verifiable credential 500B. The verifiable credential 500B (and any other verifiable credential discussed herein) can be any type of data structure that includes a claim or attribute made on behalf of one party for another party that is verifiable in the manner disclosed herein. Accordingly, the embodiments and claims disclosed herein are not limited to any particular type or implementation of a verifiable credential.

Figure 6A:
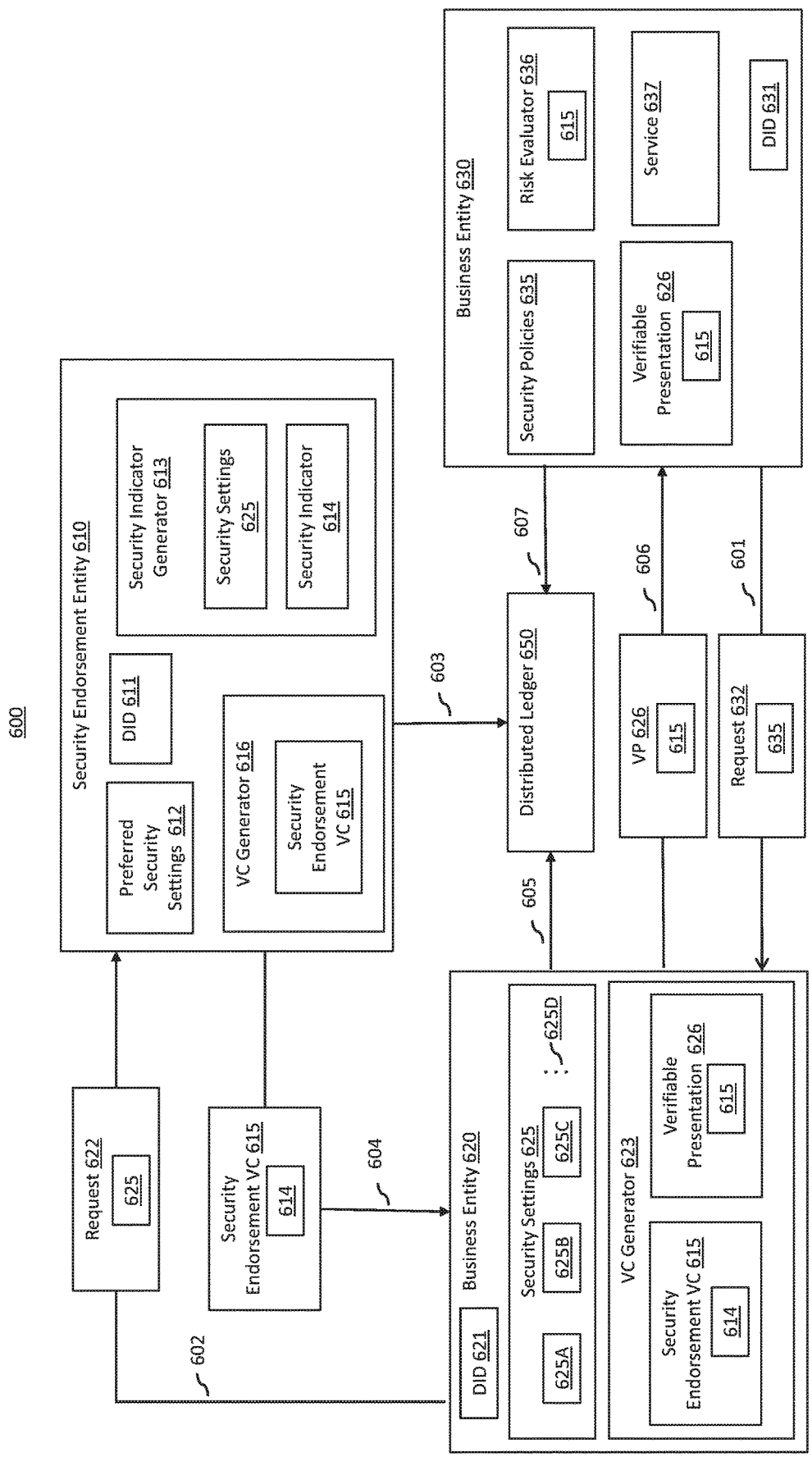
FIG. 6A illustrates an example environment that can be used to implement a security endorsement verifiable claim.

The verifiable credential 500B includes a claim 510, which corresponds to the claim 510 of FIG. 6A and includes the DID 511A. The verifiable credential 500B also includes a signature 530, which is generated by signing the verifiable credential 500B by a private key of the issuer. The signature 530 is typically a cryptographic mechanism (such as a digital signature) that is used to detect whether the verifiable credential 500B has been tampered with since the time that the verifiable credential 500B was issued, and can be used to verify identity of the issuer of the verifiable credential 500B.

Once the verifiable credential 500B is generated, at least a portion of data related to the verifiable credential 500B is propagated onto a distributed ledger (e.g., distributed ledger 220), such that a relying entity can use the portion of data propagated onto the distributed ledger to verify the verifiable credential 500B. In some embodiments, the public key corresponding to the private key of the issuer is propagated onto the distributed ledger. In some embodiments, a hash of the public key or a hash of the verifiable credential 500B is propagated onto the distributed ledger.

In some embodiments, the verifiable credential 500B also includes various metadata 520 related to the verifiable credential 500B. For example, the metadata includes, but is not limited to, (1) a unique identifier 521 identifying the corresponding verified claim 510, (2) one or more conditions 522 for accessing the verifiable credential 500B, and/or (3) duration information metadata 523 related to a duration of time that the issuer wants the verifiable credential 500B to be valid for or useable for.

The one or more conditions 522 for accessing the verifiable credential 500B, include but are not limited to, (1) requiring the relying entity to pay a predetermined amount of cryptocurrency or type of currency, (2) requiring the relying entity to provide identification information, (3) requiring the relying entity to provide one or more verifiable claim(s), (4) requiring the relying entity to grant permission for accessing a portion of data, and/or (5) requiring the relying entity to provide a particular service.

The duration information metadata 523 includes, but is not limited to, (1) an expiration time of the corresponding verifiable credential 500B, (2) a predetermined number of times that the corresponding verifiable credential 500B can be accessed or used, (3) a mechanism that automatically causes the verifiable credential 500B to expire in response to a directive from the issuer, or (4) a mechanism that allows the user to manually cause the verifiable credential 500B to expire.

FIG. 6A illustrates an embodiment of a computing system environment 600 that includes a security endorsement entity 610 that is associated with a DID 611, which is created in the manner previously described in relation to DID 205. The computing system environment 600 also includes a business entity 620 and a business entity 630, both of which include in some embodiments a DID 621 and DID 631 respectively that are created in the manner previously described in relation to DID 205. In some embodiments, the business entities 620 and 630 may be tenants of a cloud hosting service that is owned by an entity that also owns or otherwise controls the security endorsement entity 610. Accordingly, the security endorsement entity 610 may have components that run on the computing systems of the business entities 620 and 630. It will be appreciated that the actions described as being performed by the security endorsement entity 610, the business entity 620, and/or the business entity 630 are performed by computing systems of each of these entities.

In the embodiments disclosed herein, the business entity 620 and the business entity 630 are able to conduct business with each other. For example, the business entity 630 includes a service 637 that the business entity 620 is able to purchase, for example cyber insurance. Alternatively, the business entities 620 and 630 may collaborate on a shared business objective. However, the business entity 630 also includes various security policies 635 that specify the types of security settings, security policies, and/or other security configurations that the business entity 620 should have before the business entity 630 will do business with the business entity 620. Although not illustrated, the business entity 620 may also have security policies that should be complied with before it will do business with the business entity 630 or some other entity.

Accordingly, the business entity 630 will desire to know if the business entity 620 is able to comply with the security policies 635 before beginning to do business together. In conventional systems, there is no efficient way for the business entity 620 to show that it is able to comply with the security policies 635 without going through a lengthy audit that often requires several phone calls and meetings, which may consume a large amount of time and computing resources.

In addition, the business entity 620 will often provide proof of compliance with the security policies 635 through the use of screen shots and the like that attempt to show that the business entity 620 is implementing security settings that are in compliance. However, even if the screen shots show that the security settings are in compliance with the security policies 635, there is often no way for the business entity 630 to ensure that the business entity 620 is in fact implementing the compliant security settings. That is, the business entity 630 often has no way of knowing whether the screen shots have been fraudulently produced by the business entity 620.

One solution would be to allow the business entity 630 access to the security settings of the business entity 620 so that the business entity 630 could verify that the security settings were actually in compliance with the security policies 635. However, allowing access to the business entity 630 might allow the business entity 630 to gain information about underlying security infrastructure implemented by the business entity 620. With such information, the business entity 630 could learn of specific weak points in the security infrastructure that it could exploit should it have a malicious intent. Accordingly, there is little incentive for the business entity 620 to allow such access to the business entity 630 even at the cost of doing business with the business entity 630.

Accordingly, the embodiments disclosed herein advantageously provide a solution to these problems through use of the security endorsement entity 610. In the embodiments, the security endorsement entity 610 is a well-known, trusted entity that is able to provide a security endorsement verifiable credential to a business entity 620 that specifies the security settings being implemented by the business entity 620. The business entity 620 can then provide the security endorsement verifiable credential to the business entity 630. The business entity 630 is then able to verify that the security endorsement verifiable credential is from the security endorsement entity 610. Because the security endorsement entity 610 is a well-known, trusted entity, the business entity 630 can trust the claim made by the security endorsement entity 610 and can know which security settings of the business entity 620 is implementing. If these security settings are sufficient to comply with the security policies 635, the business entity 630 can confidently do business with the business entity 620. The use of the security endorsement verifiable credential will now be described in more detail to follow.

The use of the security endorsement entity 610 and the security endorsement verifiable credential provide the technical effect of removing human actors from the process of the business entity 620 providing proof that it complies with the security policies of the business entity 630. This in turn reduces time and computing resources needed to complete this process. Thus, the computing systems of the business entities 620 and 630 are improved. In addition, the business entity 630 only learns if the business entity has security settings that comply with its security policies. The business entity 630 does not gain any access to or information about the underlying security infrastructure of the business entity 620 and thus the control of that infrastructure is maintained, which enhances the privacy of the business entity 620.

As mentioned, the security endorsement entity 610 is considered a trusted party that is trusted by other entities such as the business entity 620 and the business entity 630 to provide security setting standards that can be used to test or determine if the business entity 620 and/or the business entity 630 have security settings that comply with the security standards of the security endorsement entity 610. Accordingly, the security endorsement entity 610 includes preferred security settings 612. The preferred security settings 612 include any type of security settings, security policies, and/or other security configurations such as, but not limited to, data loss prevention settings, Multi-Factor Authentication (MFA) settings, administrator role settings, password settings, sign-in risk settings, conditional access settings, and/or allowed application settings. It will be appreciated that the preferred security settings 612 may include any reasonable type of security setting and thus the embodiments and claims disclosed herein are not limited to any type or number of security settings implemented by the security endorsement entity 610, the business entity 620, and/or the business entity 630.

Thus, as will be described in more detail to follow, the security endorsement entity 610 is able to access various security settings of the business entity 620 and/or the business entity 630 and then is able to provide an indicator such as a score or ranking that indicates how well the business entity is complying with the preferred security settings 612. In some embodiments, the security endorsement entity 610 may also generate suggestions to the business entity 620 and/or the business entity 630 for improving compliance with the preferred security settings 612.

In the embodiments disclosed herein, the business entity 630 sends a request 632 including the security policies 635 to the business entity 620 when the two entities desire to conduct business with each other as shown at 601. The request 632 may specify that the business entity 620 verify that it complies with the security policies 635. Because the security endorsement entity 610 is a trusted security entity, in some embodiments, the security policies 635 may match or otherwise correspond to the preferred security settings 612.

As illustrated, the business entity 620 includes various security settings 625. For example, the business entity 620 includes a first security setting 625A, a second security setting 625B, a third security setting 625C, and any number of additional security settings 625D as illustrated by the ellipses. The security settings 625 include any type of security settings, security policies, and/or other security configurations such as, but not limited to, data loss prevention settings, Multi-Factor Authentication (MFA) settings, administrator role settings, password settings, sign-in risk settings, conditional access settings, and/or allowed application settings. In response to receiving the request 632, the business entity 620 sends a request 622 as shown at 602 including the security settings to the security endorsement entity 610 for the generation of a security endorsement verifiable credential 615. In some embodiments, the security endorsement entity 610 may already have access to the security setting 625 such as when the business entity 620 is a tenant of the entity that owns the security endorsement entity 610. In addition, in some embodiments the security endorsement entity 610 may generate the security endorsement verifiable credential 615 as part of its service to the business entity 620 without the need for the request 622. In other words, the security endorsement entity 610 may provide the security endorsement verifiable credential 615 to the business entity 620 as part of a business arrangement between both of these entities prior to the business entity 620 receiving the request 632 from the business entity 630 and without the need for the request 622.

The security endorsement entity 610 includes a security indicator generator 613. In operation, the security indicator generator 613 accesses the security settings 625 of the business entity 620. In some embodiments, the security settings 625 are compared with the preferred security settings 612. Based on this comparison, a security indicator 614 is generated by security indicator generator 613. In other embodiments, the security indicator may simply state the current state of the security settings 625 without any comparison with the preferred security settings 612.

The security indicator 614 is an indicator that specifies the security posture of the business entity 620. In one embodiment, the security indicator 614 is a score or a percentage that is indicative of how secure the business entity is. For example, the score could be 85 out of 100, with 100 being a perfect security score based on the preferred security settings 612. In some embodiments, the score may be, but is not limited to, a Microsoft Secure Score or a Microsoft Compliance Score. Thus, the score may be any reasonable type of score. In other embodiments, the security indicator 614 may be a textual notice such as "the business entity 620 complies with the preferred security settings 612" or "the business entity has security settings that sufficiently secure." In still other embodiments, the security indicator 614 may be a graphical indicator that shows a graphic such as a check mark that indicates that the business entity 620 is has security settings that are sufficiently secure. It will be appreciated that the embodiments and claims disclosed herein are not limited to any particular type of security indicator 614.

The security endorsement entity 610 includes a Verifiable Credential (VC) generator 616. In operation, the verifiable credential generator 616 is able to generate a security verifiable credential 615 that includes the security indicator 614. FIG. 6B illustrates an example data structure that represents a claim 640 that is made by the security endorsement entity 610 on behalf of the business entity 620. The claim 640 includes a subject 642 that identifies the business entity 620 and includes the DID 621, a property 644 that lists the security indicator 614 and a value 646 that includes the value of the security indicator, which may be a score, a textual value, or a graphic value.

Figure 6C:
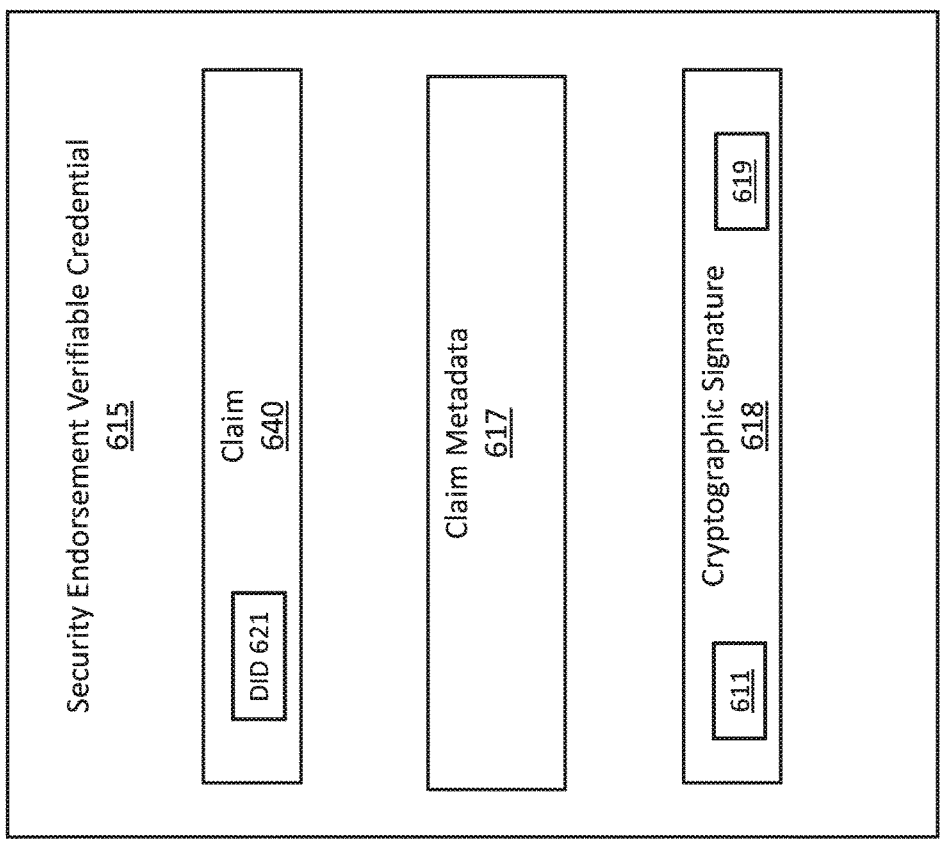
FIG. 6C illustrates an example security endorsement verifiable credential.
Figure 6B:
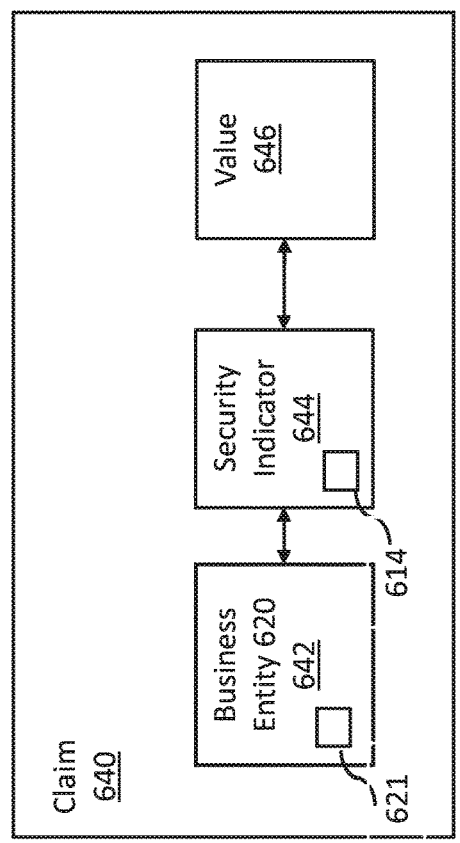
FIG. 6B illustrates an example claim.

FIG. 6C illustrates an example data structure of the security endorsement verifiable credential 615. The security endorsement verifiable credential 615 includes the claim 640 and includes the DID 621. The endorsement verifiable credential 615 also includes a cryptographic signature 618 which is generated by the security endorsement entity 610 signing the security endorsement verifiable credential 615 by a private key that is associated with a DID 611 and is part of key pair with a public key 619 included with the cryptographic signature 618. The cryptographic signature 618 is typically a cryptographic mechanism (such as a digital signature) that is used to detect whether the security endorsement verifiable credential 615 has been tampered with since the time that the security endorsement verifiable credential 615 was issued, and can be used to verify identity of the security endorsement entity 610. In some embodiments, the security endorsement verifiable credential 615 also includes various clam metadata 617 related to the security endorsement verifiable credential 615. The claim metadata 617 corresponds to the claim metadata 520 previously discussed. In particular, the claim metadata 617 includes duration information that specifies how long the security endorsement verifiable credential 615 is to be useable by the business entity 620 before needing to be updated by the security endorsement entity 610.

Once the security endorsement verifiable credential 615 is generated, at least a portion of the data related to the security endorsement verifiable credential 615 is propagated onto a distributed ledger 650 (corresponding to the distributed ledger 220) by the security endorsement entity 610 as shown in FIG. 6A at 603, such that a third party entity can use the portion of data propagated onto the distributed ledger to verify the security endorsement verifiable credential 615. For example, in some embodiments the DID 611 or the public key 619 is propagated onto the distributed ledger 650 for use in validating the security endorsement verifiable credential 615. In other embodiments, a hash of the public key 619 or a hash of the security endorsement verifiable credential 615 is propagated onto the distributed ledger 650. As shown in FIG. 6A at 604, the security endorsement entity 610 provides the security endorsement verifiable credential 615 to the business entity 620. In some embodiments, the business entity 620 can access the distributed ledger 650 as shown at 605 to verify the cryptographic signature 618 using the DID 611 and/or the public key 619. A successful verification of the cryptographic signature 618 will verify that the security endorsement verifiable credential 615 has not been forged by some other party before it is received by the business entity 620.

The business entity 620 includes a verifiable credential generator 623. In operation, the VC generator 623 accesses the security endorsement verifiable credential 615 and generates a verifiable presentation (VP) 626 that includes the security endorsement verifiable credential 615. The verifiable presentation 626 is a type of verifiable credential that is used to present a verifiable credential to an entity. Thus, the verifiable presentation 626 can be any type of data structure that allows the business entity 620 to present or provide the verifiable credential 615 to the business entity 630. Accordingly, the embodiments and claims disclosed herein are not limited to any particular type or implementation of the verifiable presentation 626.

Figure 6D:
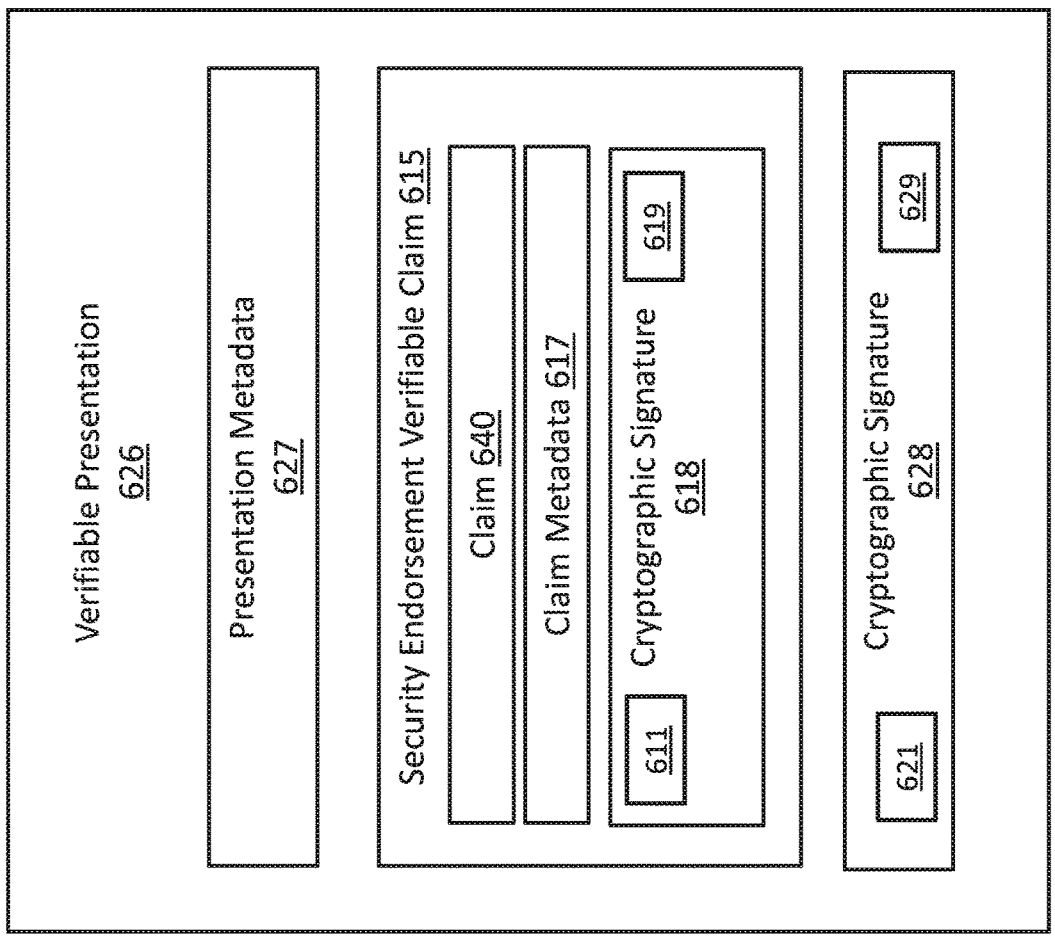
FIG. 6D illustrates an example verifiable presentation having an embedded security endorsement verifiable claim.

FIG. 6D illustrates an example data structure of the verifiable presentation 626. The verifiable presentation 626 includes presentation metadata 627, which corresponds to the claim metadata 520. In the embodiments disclosed herein, the presentation metadata 627 includes duration information that specifies how long the verifiable presentation 626 is to be valid. The verifiable presentation 626 also includes security endorsement verifiable credential 615. Finally, the verifiable presentation 626 includes a cryptographic signature 628 which is generated by the business entity signing the verifiable presentation 626 by a private key that is associated with the DID 621 of the business entity and is part of key pair with a public key 629 included with the cryptographic signature 628. The cryptographic signature 628 is typically a cryptographic mechanism (such as a digital signature) that is used to detect whether the verifiable presentation 626 has been tampered with since the time that the verifiable presentation 626 was issued, and can be used to verify identity of the business entity 620.

Once the verifiable presentation 626 is generated, at least a portion of the data related to the verifiable presentation 626 is propagated onto a distributed ledger 650 by the security endorsement entity 610 as shown in FIG. 6A at 605, such that a third party entity can use the portion of data propagated onto the distributed ledger to verify the verifiable presentation 626. For example, in some embodiments the DID 621 or the public key 629 is propagated onto the distributed ledger 650 for use in validating the verifiable presentation 626. In other embodiments, a hash of the public key 629 or a hash of the verifiable presentation 626 is propagated onto the distributed ledger 650. As shown in FIG. 6A at 606, the business entity 620 provides the verifiable presentation 626 to the business entity 630.

The business entity 630 receives the verifiable presentation 626. Upon receipt of the verifiable presentation 626, the business entity can access the distributed ledger se as shown at 607 to verify the cryptographic signature 628 using the DID 621 and/or the public key 629. A successful verification of the cryptographic signature 628 will verify that the verifiable presentation 626 has been sent from the business entity 620 and has not been tampered with by a malicious party as such tampering would cause the verification to fail. In addition, presentation metadata 627 allows the business entity 630 to know that the verifiable presentation 626 is not out of date.

After verifying that the verifiable presentation 626 is valid, the business entity 630 can again access the distributed ledger 650 as shown at 607 to verify the cryptographic signature 618 using the DID 611 and/or the public key 619. A successful verification of the cryptographic signature 618 will verify that the security endorsement credential has not been forged by the business entity 620 or by some other party as such tampering would cause the verification to fail. In addition, claim metadata 617 allows the business entity 630 to know that the security endorsement verifiable credential 615 is not out of date.

The business entity 630 can extract the claim 640 from the security endorsement verifiable credential 615. As previously discussed, the claim 640 includes the security indicator 614 that indicates the security posture of the business entity 620. The business entity 630 includes a risk evaluator 636 that in operation evaluates the security indicator 614. If the security indicator 614 indicates that the security posture of the business entity 620 sufficiently complies with the security policies 635, then the business entity is able to conduct business with the business entity 620. On the other hand, if the security posture of the business entity 620 fails to sufficiently comply with the security policies 635, then the business entity is unlikely to conduct business with the business entity 630.

Accordingly, because the business entity 630 is able to verify that the security endorsement verifiable credential 615 is valid, the business entity 630 can trust that the security indicator 614 has not been tampered with or is out of date. In addition, because the security endorsement entity 610 is a trusted party, the business entity 630 can trust that the security posture of the business entity 620 specified in the security indicator 614 is correct.

The business entity 620 is able to use the security endorsement verifiable credential 615 to provide its security posture to the business entity 630 without having to allow the business entity 630 access to its underlying security infrastructure. In addition, the use of the security endorsement verifiable credential 615 reduces the amount of time and computing resources needed for the business entity 620 to prove to the business entity 630 that it complies with the security policies 635.

In one specific embodiment, the business entity 630 may be a cyber insurance agency that provides cyber insurance as the service 637 to the business entity 620. In this embodiment, the cyber insurance agency will utilize the security endorsement verifiable credential 615 and the verifiable presentation 626 in the manner previously described to ensure that the business entity 620 has a sufficiently strong enough security posture before it will provide cyber insurance to the business entity 620.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
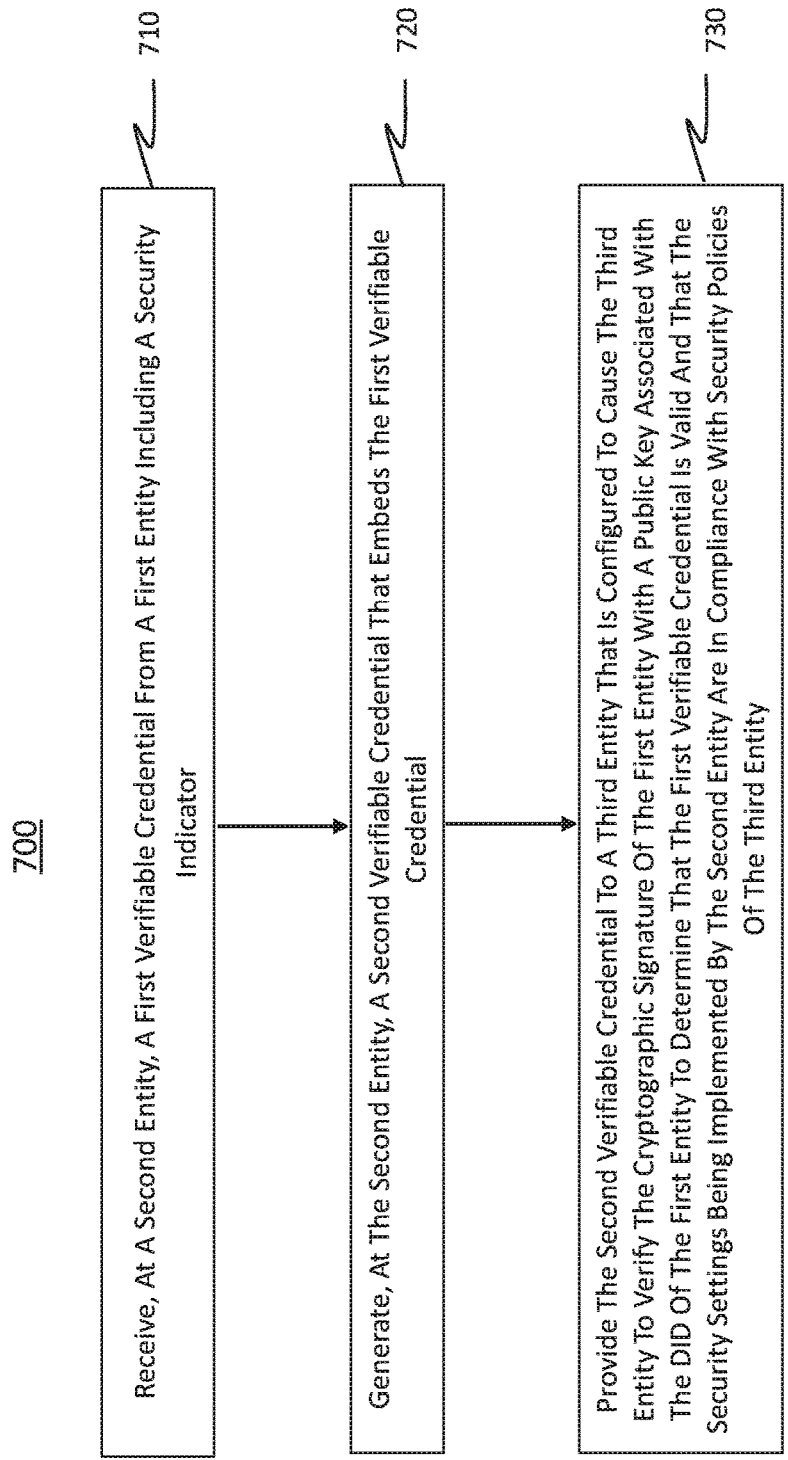
FIG. 7 illustrates a flow chart of an example method for a second entity to use a security endorsement verifiable claim from a first entity to present its security posture a third entity.

FIG. 7 illustrates a flow chart of an example method 700 for a second entity to use a security endorsement verifiable claim from a first entity to present its security posture a third entity. The method 700 will be described with respect to one or more of FIGS. 2-6 discussed previously.

The method 700 includes receiving, at a second entity, a first verifiable credential from a first entity, the first verifiable credential being cryptographically signed by the first entity using a decentralized identifier (DID) of the first entity, the first verifiable credential including a security indicator specifying a security posture of the second entity that is based on one or more security settings being implemented by the second entity (710). For example, as previously described the business entity 620 receives the security endorsement verifiable credential 615 that includes the cryptographic signature 618 from the security endorsement entity 610. The security endorsement verifiable credential 615 includes the security indicator 614 that specifies the security settings 625 implemented by the business entity 620

The method 700 includes generating, at the second entity, a second verifiable credential, the second verifiable credential embedding the first verifiable credential therein (720). For example, as previously described the business entity 620 generates the verifiable presentation 626.

The method 700 also includes providing the second verifiable credential to a third entity, the second verifiable credential being configured to cause the third entity to verify the cryptographic signature of the first entity with a public key associated with the DID of the first entity to determine that the first verifiable credential is valid and that the one or more security settings being implemented by the second entity are in compliance with security policies of the third entity (730). For example, as previously described the business entity 620 provides verifiable presentation 626 to the business entity 630. The verifiable presentation 626 causes the business entity 630 to access the distributed ledger 650 and use the public key 619 associated with the DID 611 of the security endorsement entity to verify the cryptographic signature 618 to determine that the security endorsement verifiable credential 615 is valid. The business entity is also caused to use the security indicator 614 to ensure that the business entity 620 is in compliance with the security policies 635.

Figure 8:
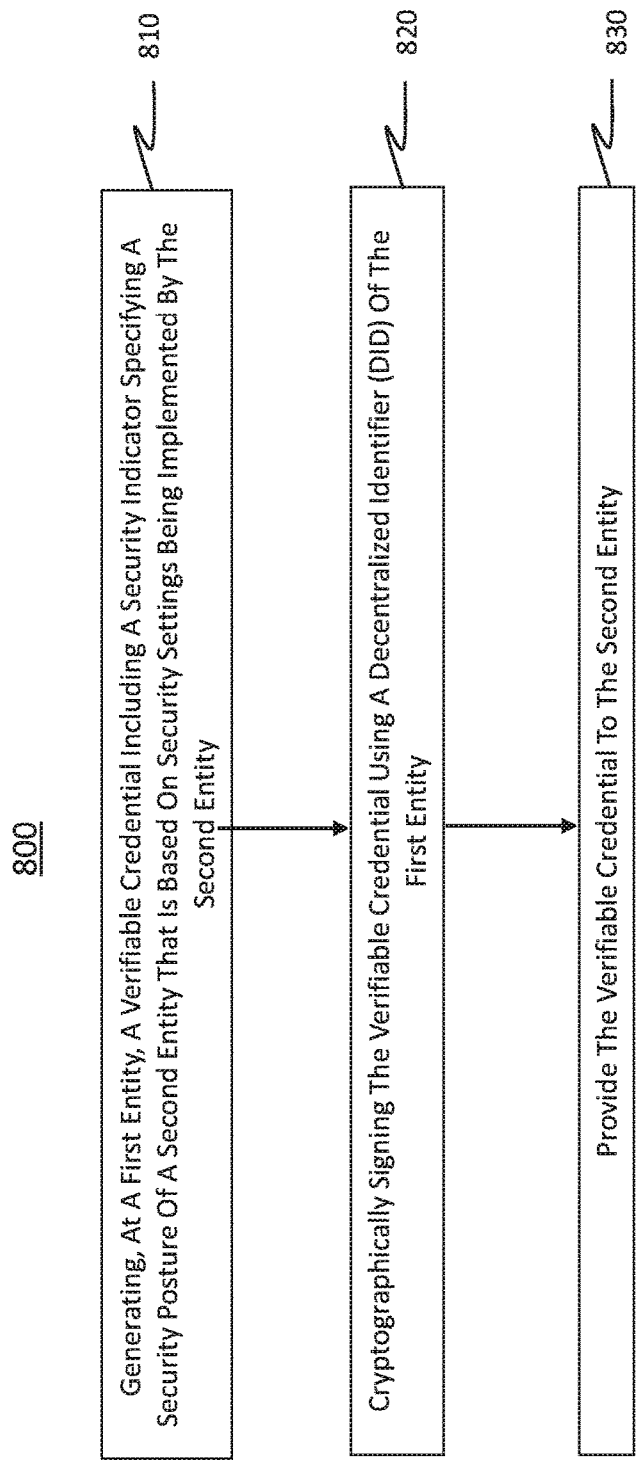
FIG. 8 illustrates a flow chart of an example method for a trusted security entity to provide a security endorsement verifiable credential to a business entity.

FIG. 8 illustrates a flow chart of an example method 800 for a trusted security entity to provide a security endorsement verifiable credential to a business entity. The method 800 will be described with respect to one or more of FIGS. 2-6 discussed previously.

The method 800 includes generating, at a first entity, a verifiable credential, the verifiable credential including a security indicator specifying a security posture of the second entity that is based on one or more security settings being implemented by a second entity (810). For example, as previously described the security endorsement entity 610 generates the security endorsement verifiable credential 615 that includes the security indicator 614. The security indicator 614 specifies a security posture of the business entity 620 that is based on the security settings 625 implemented by the business entity 620.

The method 800 includes cryptographically signing the verifiable credential using a decentralized identifier (DID) of the first entity (820). For example, as previously described the security endorsement entity 610 cryptographically signs the security endorsement verifiable credential 615 with the cryptographic signature 618 that includes the DID 611.

The method 800 includes providing the verifiable credential to a second entity (830). For example, as previously described the security endorsement entity 610 provides the security endorsement verifiable credential 615 to the business entity 620.

Figure 9:
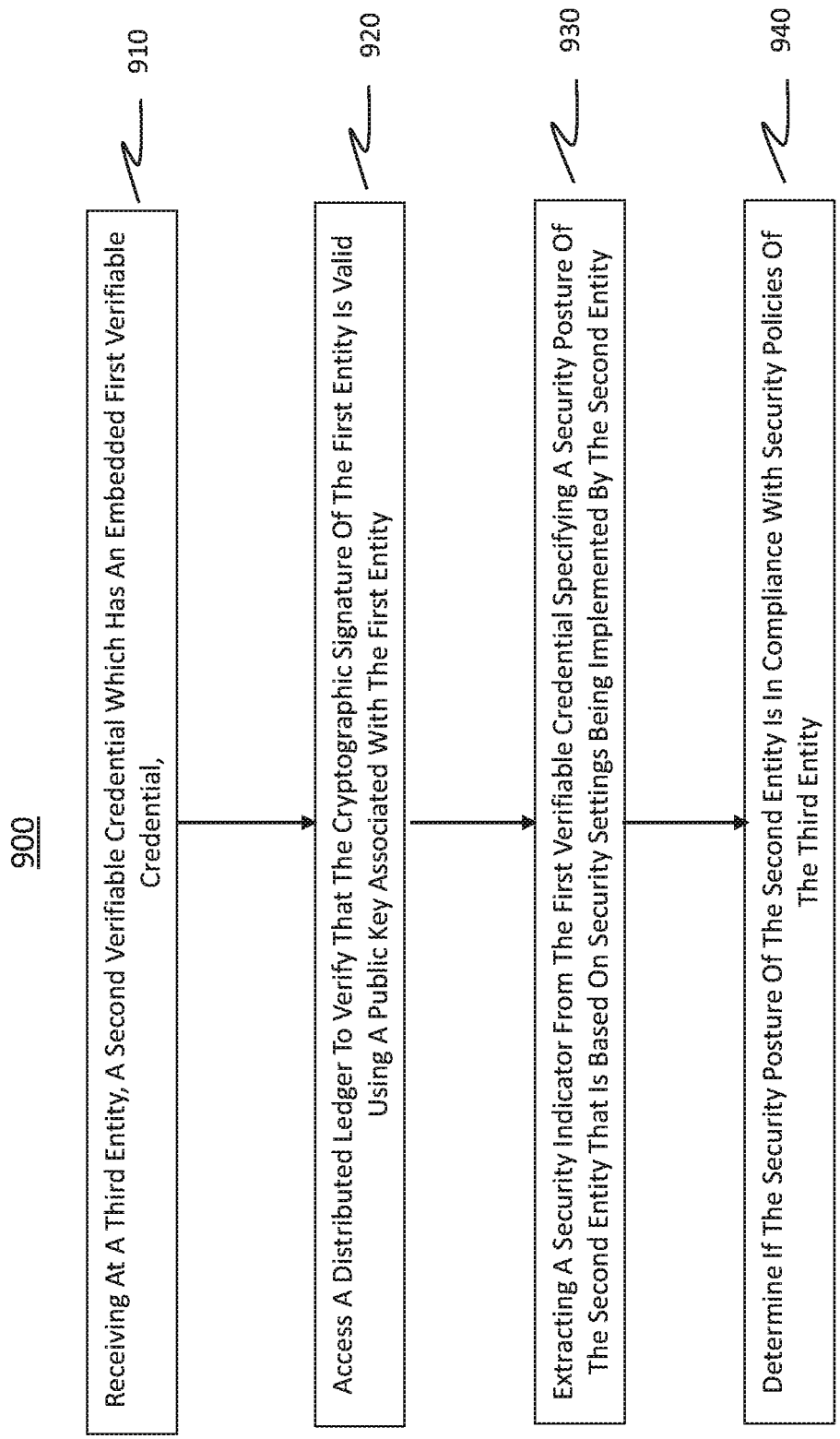
FIG. 9 illustrates a flow chart of an example method for a third entity to use a first and second verifiable credential from a first and second entity to determine if the second entity complies with security policies of the third entity.

FIG. 9 illustrates a flow chart of an example method 900 for a third entity to use a first and second verifiable credential from a first and second entity to determine if the second entity complies with security policies of the third entity. The method 900 will be described with respect to one or more of FIGS. 2-6 discussed previously.

The method 900 includes receiving, at a third entity, a second verifiable credential which has embedded therein a first verifiable credential, the second verifiable credential being generated by a second entity and being cryptographically signed by the second entity using a decentralized identifier (DID) of the second entity, the first verifiable credential being generated by a first entity and being cryptographically signed by the first entity using a decentralized identifier (DID) of the first entity (910). For example, as previously described the business entity 630 receives the verifiable presentation 626 that embeds the security endorsement verifiable credential 615. The verifiable presentation 626 includes the cryptographic signature 628 and the security endorsement verifiable credential 615 includes the cryptographic signature 618.

The method 900 includes accessing a distributed ledger to verify that the cryptographic signature of the first entity is valid using a public key associated with the first entity (920). For example, as previously described business entity 630 accesses the distributed ledger 650 and uses the public key 619 to verify that the cryptographic signature 618 is valid.

The method 900 includes extracting a security indicator from the first verifiable credential, the security indicator specifying a security posture of the second entity that is based on one or more security settings being implemented by the second entity (930). For example, as previously described the business entity 630 extracts the security indicator 614 from the security endorsement verifiable credential 615. The security indicator 614 specifies a security posture of the business entity 620 that is based on the security settings 625 implemented by the business entity 620.

The method 900 includes determining if the security settings implemented by the second entity are in compliance with security policies of the third entity (940). For example, as previously described business entity 630 uses the risk evaluator 636 to determine if the security posture of the business entity 620 is in compliance with the security policies 635.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage devices having thereon computer-executable instructions that are structured such that, when executed by the one or more processors, cause the computing system to:
receive, at a second entity, a first verifiable credential from a first entity, the first verifiable credential being cryptographically signed by the first entity using a decentralized identifier (DID) of the first entity, the first verifiable credential comprising a security indicator specifying a security posture of the second entity that is based on one or more security settings being implemented by the second entity;
generate, at the second entity, a second verifiable credential, the second verifiable credential embedding the first verifiable credential therein; and
provide the second verifiable credential to a third entity, the second verifiable credential being configured to cause the third entity to verify the cryptographic signature of the first entity with a public key associated with the DID of the first entity to determine that the first verifiable credential is valid and that the one or more security settings being implemented by the second entity are in compliance with security policies of the third entity.

2. The computing system of claim 1, wherein the second verifiable credential is cryptographically signed by the second entity using a DID of the second entity.

3. The computing system of claim 1, wherein generating the second verifiable credential comprises propagating a public key associated with the DID of the second entity onto a distributed ledger.

4. The computing system of claim 1, wherein the first verifiable credential is received from the first entity in response to a request from the second entity.

5. The computing system of claim 1, wherein the first verifiable credential is provided to the second entity by the first entity in accordance with a business arrangement between the first and second entities.

6. The computing system of claim 1, wherein the security indicator is a score that specifies the security posture of the second entity.

7. The computing system of claim 1, wherein the security indicator is a textual notice that specifies the security posture of the second entity.

8. The computing system of claim 1, wherein the second entity provides the second verifiable credential to the third entity in response to a request from the third entity to do business with the second entity.

9. The computing system of claim 1, wherein the one or more security settings include one or more of data loss prevention settings, Multi-Factor Authentication (MFA) settings, administrator role settings, password settings, sign-in risk settings, conditional access settings, or allowed application settings.

10. A computing system comprising:
one or more processors; and
one or more computer-readable hardware storage devices having thereon computer-executable instructions that are structured such that, when executed by the one or more processors, cause the computing system to:
receive, at a third entity, a second verifiable credential which has embedded therein a first verifiable credential, the second verifiable credential being generated by a second entity and being cryptographically signed by the second entity using a decentralized identifier (DID) of the second entity, the first verifiable credential being generated by a first entity and being cryptographically signed by the first entity using a DID of the first entity;
access a distributed ledger to verify that the cryptographic signature of the first entity is valid using a public key associated with the first entity;
extract a security indicator from the first verifiable credential, the security indicator specifying a security posture of the second entity that is based on one or more security settings being implemented by the second entity; and
determine if the security posture of the second entity is in compliance with security policies of the third entity.

11. The computing system of claim 10, wherein the computing system is further caused to:
access the distributed ledger to verify that the cryptographic signature of the second entity is valid using a public key associated with the second entity.

12. The computing system of claim 10, wherein the third entity is one of an entity that provides cyber insurance to the second entity or an entity that does business with the second entity.

13. A method comprising:
receiving, at a second entity, a first verifiable credential from a first entity, the first verifiable credential being cryptographically signed by the first entity using a decentralized identifier (DID) of the first entity, the first verifiable credential comprising a security indicator specifying a security posture of the second entity that is based on one or more security settings being implemented by the second entity;
generating, at the second entity, a second verifiable credential, the second verifiable credential embedding the first verifiable credential therein; and
providing the second verifiable credential to a third entity, the second verifiable credential being configured to cause the third entity to verify the cryptographic signature of the first entity with a public key associated with the DID of the first entity to determine that the first verifiable credential is valid and that the one or more security settings being implemented by the second entity are in compliance with security policies of the third entity.

14. The method of claim 13, wherein the second verifiable credential is cryptographically signed by the second entity using a DID of the second entity.

15. The method of claim 13, wherein generating the second verifiable credential comprises propagating a public key associated with the DID of the second entity onto a distributed ledger.

16. The method of claim 13, wherein the first verifiable credential is received from the first entity in response to a request from the second entity.

17. The method of claim 13, wherein the first verifiable credential is provided to the second entity by the first entity in accordance with a business arrangement between the first and second entities.

18. The method of claim 13, wherein the security indicator is a score that specifies the security posture of the second entity.

19. The method of claim 13, wherein the security indicator is a textual notice that specifies the security posture of the second entity.

20. The method of claim 13, wherein the second entity provides the second verifiable credential to the third entity in response to a request from the third entity to do business with the second entity.

* * * * *